(12) United States Patent
Cheng et al.

(10) Patent No.: US 11,316,558 B1
(45) Date of Patent: Apr. 26, 2022

(54) LOG IN SYSTEM AND LOG IN METHOD OF FIELD

(71) Applicants: ASKEY COMPUTER CORP., New Taipei (TW); ASKEY TECHNOLOGY (JIANGSU) LTD., Jiangsu Province (CN)

(72) Inventors: Yen Chi Cheng, Kaohsiung (TW); Yu Ting Hsiao, Taichung (TW); Huan-Ruei Shiu, Taipei (TW)

(73) Assignees: ASKEY COMPUTER CORP., New Taipei (TW); ASKEY TECHNOLOGY (JIANGSU) LTD., Jiangsu Province (CN)

(*) Notice: Subject to any disclaimer, the term of this patent is extended or adjusted under 35 U.S.C. 154(b) by 0 days.

(21) Appl. No.: 17/226,010

(22) Filed: Apr. 8, 2021

(30) Foreign Application Priority Data

Jan. 5, 2021 (TW) .................................. 110100211

(51) Int. Cl.
*H04B 5/00* (2006.01)
*H04W 4/029* (2018.01)
*H04W 4/80* (2018.01)
*H02J 50/00* (2016.01)

(52) U.S. Cl.
CPC .......... *H04B 5/0037* (2013.01); *H02J 50/001* (2020.01); *H04W 4/029* (2018.02); *H04W 4/80* (2018.02)

(58) Field of Classification Search
CPC ...... H04B 5/0037; H04W 4/029; H04W 4/80; H02J 50/001
See application file for complete search history.

(56) References Cited

U.S. PATENT DOCUMENTS

| | | | | |
|---|---|---|---|---|
| 5,585,614 | A * | 12/1996 | VonBallmoos | G07C 9/10 235/382 |
| 6,498,955 | B1 * | 12/2002 | McCarthy | G05B 13/0265 700/1 |
| 2003/0028814 | A1 * | 2/2003 | Carta | G07C 9/257 726/21 |
| 2008/0014867 | A1 * | 1/2008 | Finn | H04B 5/0062 455/41.1 |
| 2012/0196529 | A1 * | 8/2012 | Huomo | H04B 5/0031 455/41.1 |
| 2015/0150101 | A1 * | 5/2015 | Novack | H04L 63/0861 726/7 |
| 2016/0156219 | A1 * | 6/2016 | Copeland | H02J 50/001 307/52 |
| 2016/0241999 | A1 * | 8/2016 | Chin | G08C 23/04 |
| 2017/0364905 | A1 * | 12/2017 | Hart | H04B 5/0031 |

* cited by examiner

*Primary Examiner* — David Bilodeau
(74) *Attorney, Agent, or Firm* — JCIPRNET

(57) ABSTRACT

A log in system and a log in method of a field are provided. The log in method includes: broadcasting a first RF (RF) signal and a second RF signal by a gateway; a sensing card receiving the first RF signal to switch from a disable mode to an enable mode, the sensing card receiving the second RF signal in the enable mode and generating a communicating channel between the sensing card and the gateway in response to the second RF signal; the gateway receiving sensing card information from the sensing card via the communicating channel and recording an identity corresponding to the sensing card to a log in list corresponding to the field according to the sensing card information.

18 Claims, 3 Drawing Sheets

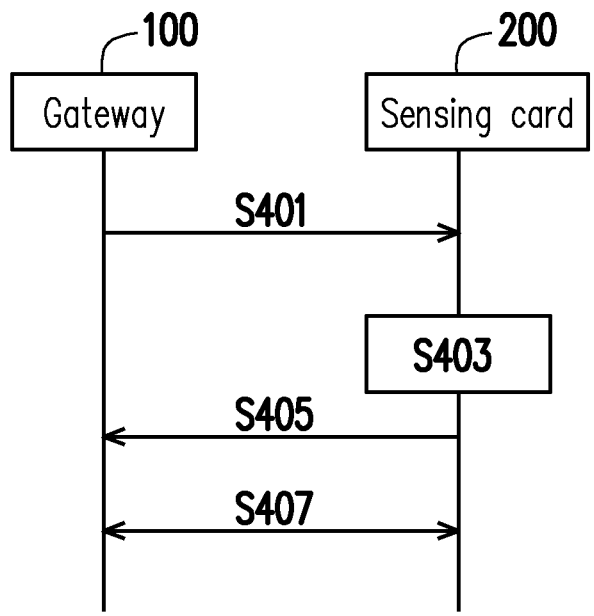

FIG. 4

```
┌─────────────────────────────────────┐
│ The gateway broadcasts the first RF │──S501
│ signal and the second RF signal in  │
│           the field                 │
└─────────────────────────────────────┘
                  ↓
┌─────────────────────────────────────┐
│ The sensing card receives the first │
│ RF signal to be switched from the   │
│ disable mode to the enable mode,    │
│ and the sensing card receives the   │──S503
│ second RF signal and generates the  │
│ communication channel between the   │
│ sensing card and the gateway in     │
│ response to the second RF signal    │
└─────────────────────────────────────┘
                  ↓
┌─────────────────────────────────────┐
│ The gateway receives the sensing    │
│ card information from the sensing   │
│ card through the communication      │
│ channel, and records the            │──S505
│ identification code corresponding   │
│ to the sensing card to the log in   │
│ list corresponding to the field     │
│ according to the sensing card       │
│ information                         │
└─────────────────────────────────────┘
```

FIG. 5

LOG IN SYSTEM AND LOG IN METHOD OF FIELD

CROSS-REFERENCE TO RELATED APPLICATION

This application claims the priority benefit of Taiwan application serial no. 110100211, filed on Jan. 5, 2021. The entirety of the above-mentioned patent application is hereby incorporated by reference herein and made a part of this specification.

BACKGROUND

1. Technical Field

The disclosure relates to a log in system and log in method of a field.

2. Description of Related Art

Enterprise information security and asset management have always been important infrastructures for enterprises, which are crucial to the security and operational efficiency of enterprises. Enterprise access control systems are usually implemented using access control systems such as access sensing cards or face recognition systems. Traditional access control systems require electronic devices at the door. Not only can the electronic device configured at the entrance be damaged, but employees need to go to the location where the electronic device is located to clock in. On the other hand, the management of enterprise assets usually relies on manual inventory. All of the above-mentioned reasons can lead to waste of human resources.

SUMMARY

The disclosure provides a log in system and log in method of a field capable of automatically completing log in of a user after the user arrives at the field and monitoring whether company assets are stolen.

The log in system of a field of the disclosure includes a gateway and a sensing card. The gateway broadcasts a first RF signal and a second RF signal in the field. The sensing card receives the first RF signal to switch from a disable mode to an enable mode. The sensing card receives the second RF signal in the enable mode, and generates a communication channel between the sensing card and the gateway in response to the second RF signal. The gateway receives sensing card information from the sensing card through the communication channel, and records an identification code corresponding to the sensing card to a log in list corresponding to the field according to the sensing card information.

In an embodiment of the disclosure, the first RF signal corresponds to a first frequency band, the second RF signal corresponds to a second frequency band, and the first frequency band is different from the second frequency band, where the first RF signal corresponds to a RF energy harvesting technology, and the second RF signal corresponds to a Bluetooth communication protocol.

In an embodiment of the disclosure, the first RF signal corresponds to a first frequency band, the communication channel corresponds to a second frequency band, and the first frequency band is different from the second frequency band, where the first RF signal corresponds to a RF energy harvesting technology, and the communication channel corresponds to a Bluetooth communication protocol.

In an embodiment of the disclosure, the sensing card switches from the enable mode to the disable mode in response to not receiving the first RF signal and closes the communication channel, where the gateway removes the identification code from the log in list in response to the communication channel being closed.

In an embodiment of the disclosure, the gateway sends a warning message in response to the identification code being removed from the log in list.

In an embodiment of the disclosure, the gateway pre-stores a white list, and sends a warning message in response to the identification code not matching the white list.

In an embodiment of the disclosure, the gateway is communicatively connected to an external electronic device in the field, and activates the external electronic device according to the sensing card information in response to the communication channel being generated.

In an embodiment of the disclosure, the gateway obtains location information of the sensing card from the communication channel, and activates the external electronic device in response to the location information matching a predetermined location.

In an embodiment of the disclosure, the gateway is communicatively connected to a second external electronic device in the field and broadcasts a third RF signal, where the sensing card receives the third RF signal in the enable mode, and generates a second communication channel between the sensing card and the gateway in response to the third RF signal, where the gateway activates the second external electronic device according to the sensing card information in response to the second communication channel being generated.

In an embodiment of the disclosure, the second RF signal corresponds to a second frequency band, and the third RF signal corresponds to a third frequency band, where the second frequency band is different from the third frequency band.

A log in method of a field of the disclosure, including: a gateway broadcasting a first RF signal and a second RF signal in the field; a sensing card receiving the first RF signal and switching from a disable mode to an enable mode; the sensing card receiving the second RF signal in the enable mode, and generating a communication channel between the sensing card and the gateway in response to the second RF signal; and the gateway receiving sensing card information from the sensing card via the communicating channel and recording an identity corresponding to the sensing card to a log in list corresponding to the field according to the sensing card information.

In an embodiment of the disclosure, the first RF signal corresponds to a first frequency band, the second RF signal corresponds to a second frequency band, and the first frequency band is different from the second frequency band, where the first RF signal corresponds to a RF energy harvesting technology, and the second RF signal corresponds to a Bluetooth communication protocol.

In an embodiment of the disclosure, the first RF signal corresponds to a first frequency band, the communication channel corresponds to a second frequency band, and the first frequency band is different from the second frequency band, where the first RF signal corresponds to a RF energy harvesting technology, and the communication channel corresponds to a Bluetooth communication protocol.

In an embodiment of the disclosure, the log in method further includes: the sensing card switching from the enable mode to the disable mode in response to not receiving the first RF signal, and closing the communication channel; and the gateway removing the identification code from the log in list in response to the communication channel being closed.

In an embodiment of the disclosure, the log in method further includes: the gateway sending a warning message in response to the identification code being removed from the log in list.

In an embodiment of the disclosure, the log in method further includes: the gateway pre-storing a white list and sending a warning message in response to the identification code not matching the white list.

In an embodiment of the disclosure, the log in method further includes: the gateway being communicatively connected to an external electronic device in the field, and activating the external electronic device according to the sensing card information in response to the communication channel being generated.

In an embodiment of the disclosure, where activating the external electronic device in response to the communication channel includes: the gateway obtaining location information of the sensing card from the communication channel, and activating the external electronic device in response to the location information matching a predetermined location.

In an embodiment of the disclosure, the log in method further includes: the gateway being communicatively connected to a second external electronic device in the field and broadcasting a third RF signal; the sensing card receiving the third RF signal in the enable mode and generating a second communication channel between the sensing card and the gateway in response to the third RF signal; and the gateway activating the second external electronic device according to the sensing card information in response to the second communication channel being generated.

In an embodiment of the disclosure, where the second RF signal corresponds to a second frequency band, and the third RF signal corresponds to a third frequency band, where the second frequency band is different from the third frequency band.

Base on the above, the gateway of the disclosure can provide energy through RF signal for the sensing card to operate, so as to complete the log in of a user. In the disclosure, the sensing card can also be configured to monitor objects in the field so as to prevent the objects from being taken away from the field.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 shows a signal diagram for generating a communication channel between a gateway and a sensing card according to an embodiment of the disclosure.

FIG. 5 shows a flow chart of a log in method of a field according to an embodiment of the disclosure.

DESCRIPTION OF THE EMBODIMENTS

Figure 1:
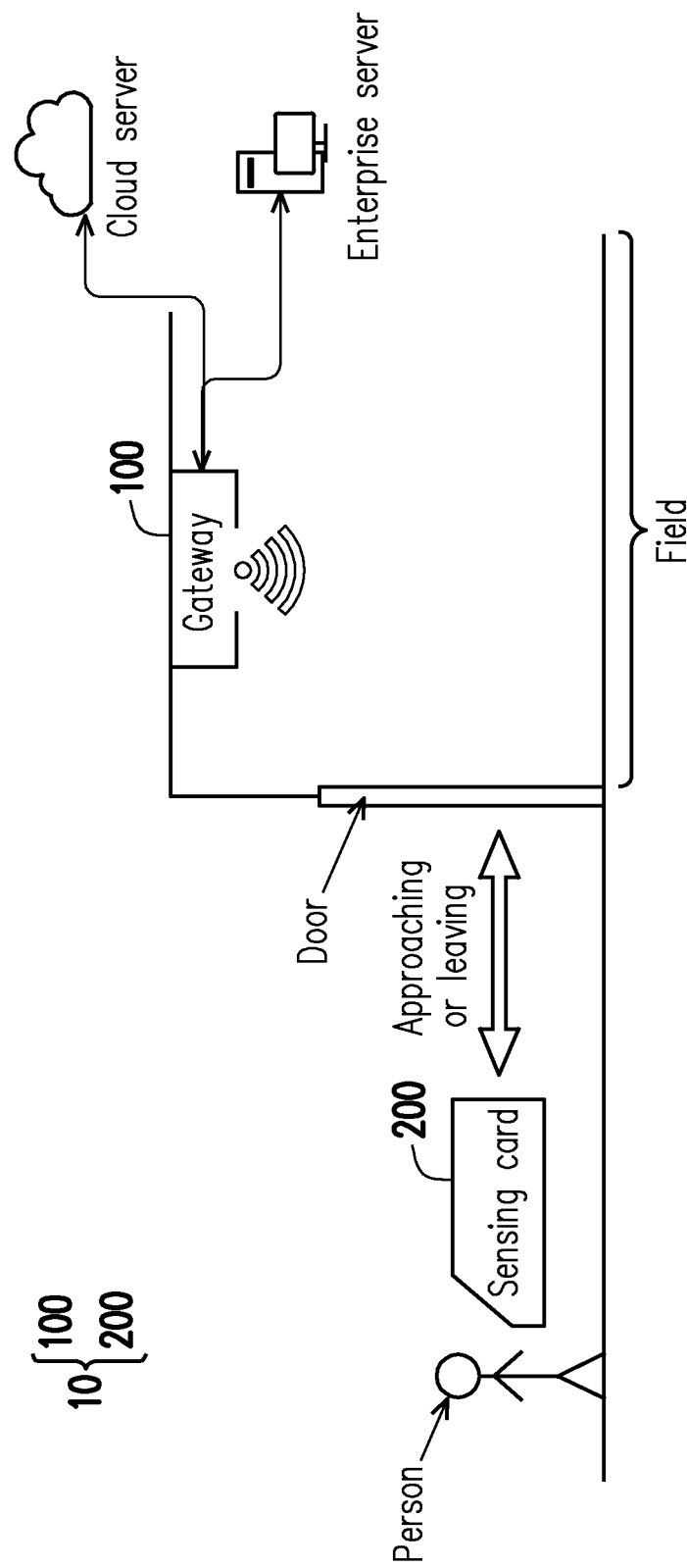
FIG. 1 shows a schematic diagram of a login system of a field according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 shows a schematic diagram of a login system 10 of a field according to an embodiment of the disclosure. The log in system 10 may be configured to monitor a person or an object in a target field, so as to proceed the person's registration or asset management. The log in system 10 may include a gateway 100 and a sensing card 200. For example, if a person holding the sensing card 200 enters the field monitored by the gateway 100, the log in system 10 may determine that the person has logged in to the field. On the other hand, if the person holding the sensing card 200 leaves the field monitored by the gateway 100, the log in system 10 may determine that the person has logged out of the field. The gateway 100 may be communicatively connected to an external server such as a cloud server or an enterprise server, so as to notify the external server of the log in status of a person (or an object).

Figure 2:
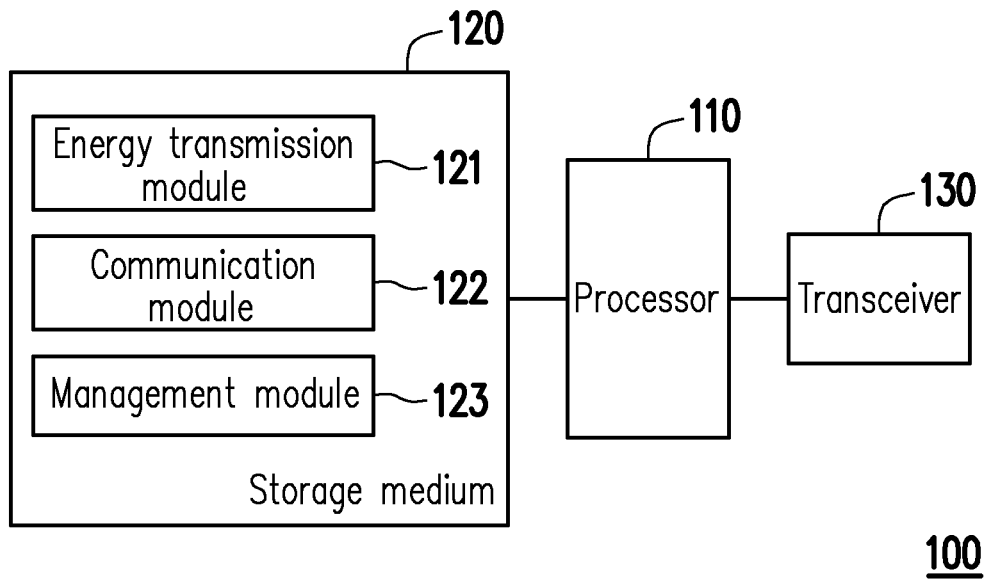
FIG. 2 shows a schematic diagram of a gateway according to an embodiment of the disclosure.

FIG. 2 shows a schematic diagram of a gateway 100 according to an embodiment of the disclosure. The gateway 100 may include a processor 110, a storage medium 120, and a transcriber 130.

The processor 110 may be, for example, a central processing unit (CPU) or other programmable general-purpose or special-purpose micro control unit (MCU), microprocessors, digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), field programmable gate arrays (FPGA), or other similar components or a combination of the components. The processor 110 may be coupled to the storage medium 120 and the transceiver 130, and accesses and executes multiple modules and various applications stored in the storage medium 120.

The storage medium 120 may be, for example, any type of fixed or removable random access memory (RAM), read-only memory (ROM), flash memory, hard disk drive (HDD), solid state drive (SSD), or other similar components or a combination of the components, and is configured to store the multiple modules or various applications that can be executed by the processor 110. In the present embodiment, the storage medium 120 may store multiple modules including an energy transmission module 121, a communication module 122, and a management module 123; the functions of which will be described later.

The transceiver 130 may send and receive signals in a wireless or wired manner. The transceiver 130 may also perform operations such as low noise amplification, impedance matching, frequency mixing, up or down frequency conversion, filtering, amplification, and the like.

Figure 3:
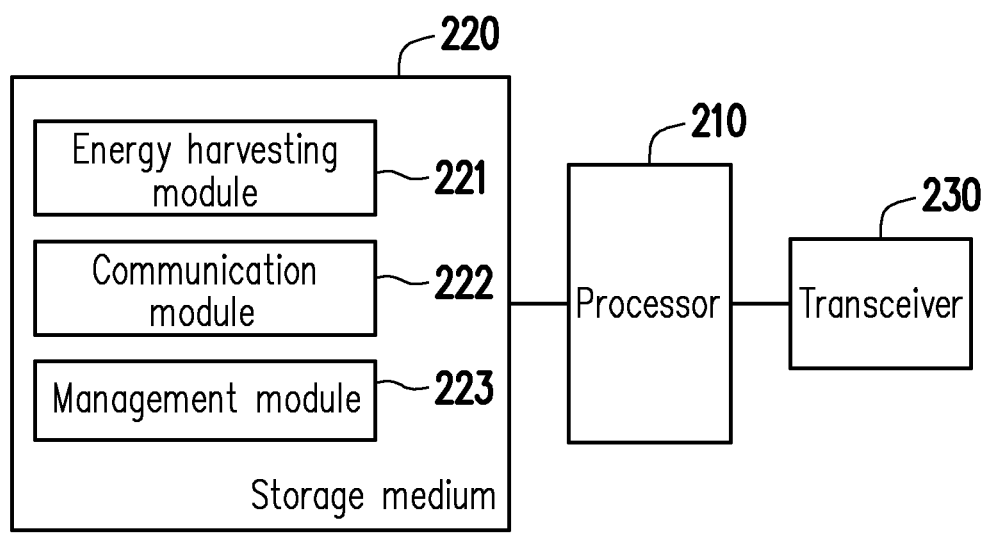
FIG. 3 shows a schematic diagram of a sensing card according to an embodiment of the disclosure.

FIG. 3 shows a schematic diagram of a sensing card 200 according to an embodiment of the disclosure. The sensing card 200 may include a processor 210, a storage medium 220, and a transceiver 230.

The processor 210 is, for example, a central processing unit, or other programmable general-purpose or special-purpose micro-control units, micro-processors, digital signal processors, programmable controllers, special-application integrated circuits, graphics processors, image signal processors, image processing units, arithmetic logic units, complex programmable logic devices, field programmable logic gate arrays or other similar components or a combination of the above components. The processor 210 may be coupled to the storage medium 220 and the transceiver 230, and accesses and executes multiple modules and various applications stored in the storage medium 220.

The storage medium 220 is, for example, any type of fixed or removable random access memory, read-only memory, flash memory, hard disk, solid state drive or similar components or a combination of the above components, and is configured to store multiple modules or various applications that may be executed by the processor 210. In the present embodiment, the storage medium 220 may store multiple modules including an energy harvesting module 221, a communication module 222, and a management module 223; the functions of which will be described later.

The transceiver 230 may send and receive signals in a wireless or wired manner. The transceiver 230 may also perform operations such as low noise amplification, impedance matching, frequency mixing, up or down frequency conversion, filtering, amplification, and the like. The transceiver 230 may include a sensing coil.

One or more transceivers 130 of the gateway 100 may be set in the target field to be monitored. The energy transmission module 121 of the gateway 100 may broadcast a first RF (RF) signal in the target field through the transceiver 130, and the communication module 122 may broadcast a second RF signal through the transceiver 130. The first RF signal may be configured to provide energy for the sensing card 200 to operate, and the second RF signal may be configured to communicate with the sensing card 200. The first RF signal and the second RF signal may correspond to different communication protocols or frequency bands. After the sensing card 200 enters the target field, the energy harvesting module 221 of the sensing card 200 may receive the first RF signal through the transceiver 230, and switch the sensing card from a disabled mode to an enable mode using the energy generated by the first RF signal. For example, the transceiver 230 may include a sensing coil. The sensing coil may sense the first RF signal to generate energy for the energy harvesting module 221 to use. The sensing card 200 simply needs to be within the coverage area of the gateway 100 to receive the first RF signal and switch to the enable mode. Therefore, when a user holding the sensing card 200 enters the target field, the user can enable the sensing card 200 without going to a specific location in the target field.

After the sensing card 200 switches from the disable mode to the enable mode, the communication module 222 of the sensing card 200 may receive the second RF signal through the transceiver 230. The communication module 222 may generate a communication channel between the sensing card 200 and the gateway 100 through the transceiver 230 according to the second RF signal. For example, the communication module 222 may send a response signal corresponding to the second RF signal to the gateway 100 through the transceiver 230. The communication module 122 of the gateway 100 may receive the response signal through the transceiver 130, and generate the communication channel between the gateway 100 and the sensing card 200 according to the response signal. The communication channel and the first RF signal (or the second RF signal) may correspond to different communication protocols or frequency bands. The sensing card 200 simply needs to be within the coverage area of the gateway 100 to receive the second RF signal, or generate the communication channel between the gateway 100 and the sensing card 200. Therefore, when a user holding the sensing card 200 enters the target field, the user can enable the sensing card 200 to complete the log in without going to a specific location in the target field.

In an embodiment, the communication protocol supported by the communication module 122 or the communication module 222 may include, but not limited, to Bluetooth or RF energy harvesting technology. For example, the energy transmission module 121 of the gateway 100 may send the first RF signal based on RF energy harvesting technology. After the energy harvesting module 221 of the sensing card 200 receives the first RF signal, the energy harvesting module 221 may generate energy using the first RF signal based on the RF energy harvesting technology. For another example, the communication module 122 of the gateway 100 may send the second RF signal, or generate the communication channel between the gateway 100 and the sensing card 200 based on Bluetooth 5.0 technology. Based on Bluetooth 5.0 technology, the communication module 222 of the sensing card 200 may receive the second RF signal, or generate the communication channel between the gateway 100 and the sensing card 200.

After the communication channel between the gateway 100 and the sensing card 200 is generated, the management module 223 of the sensing card 200 may send sensing card information to the gateway 100 through the transceiver 230 using the communication channel. The management module 123 of the gateway 100 may receive the sensing card information of the sensing card 200 from the communication channel through the transceiver 130. The sensing card information may be related to the user of the sensing card 200. For example, the sensing card information may include data of the user's identity. The management module 123 may record an identification code corresponding to the sensing card 200 (or the user or object with the sensing card 200) to a log in list corresponding to the target field according to the sensing card information. In this way, the log in procedure of the sensing card 200 to the target field can be completed. The identification code in the log in list may represent the sensing card, the person, or the object that has arrived at the target field.

For example, the gateway 100 may be communicatively connected to an attendance system of the cloud server (or enterprise server) through the transceiver 130. After the identification code of the sensing card 200 is logged in to the log in list, the gateway 100 may send the log in list to the attendance system. The attendance system may determine that the sensing card 200 is located in the target field based on the log in list, and thereby determine that the holder of the sensing card 200 has attended. For another example, the gateway 100 may be communicatively connected to an asset management system of the cloud server (or enterprise server) through the transceiver 130. After the identification code of the sensing card 200 is logged in to the log in list, the gateway 100 may send the log in list to the asset management system. The asset management system may determine that the object with the sensing card 200 is located in the target field based on the log in list.

In an embodiment, the storage medium 120 of the gateway 100 may pre-store a white list. If the identification code of the sensing card 200 does not match the white list, it means that the person holding the sensing card 200 does not have the authority to enter the target field. Therefore, the management module 123 of the gateway 100 may send a warning message through the transceiver 130.

After the sensing card 200 leaves from the target field, the management module 123 of the gateway 100 may remove the sensing card identification code from the log in list. Specifically, after the sensing card 200 leaves the target field and the energy harvesting module 221 thus cannot receive the first RF signal, the energy harvesting module 221 may switch the sensing card 200 from the enable mode to the disable mode. Accordingly, the communication channel between the sensing card 200 and the gateway 100 will be closed. The management module 123 of the gateway 100 may remove the identification code of the sensing card 200 from the log in list in response to the communication channel being closed. The removal of the identification code of the sensing card 200 from the log in list indicates that the sensing card 200 has left the target field.

In one embodiment, the management module 123 of the gateway 100 may send a warning message through the transceiver 130 in response to the identification code corresponding to the sensing card 200 being removed from the log in list. For example, if the object with the sensing card 200 is taken away from the target area by a thief, the identification code of the sensing card 200 will be removed from the log in list. Accordingly, the management module 123 may send a warning message to the asset management system to remind the asset management system that the object with the sensing card 200 has been moved outside the target field. In one embodiment, the management module 123 may periodically check whether the identification code corresponding to the sensing card 200 is removed from the log in list. For example, the management module 123 may check the log in list every ten minutes. If the object with the sensing card 200 is moved outside the target field, the management module 123 may become aware and send a warning message within ten minutes.

In addition to identifying the log in status of a person or an object, the log in system 10 may also be configured to control the authority of using electronic devices in the target field. Specifically, the management module 123 of the gateway 100 may be communicatively connected to an electronic device in the target field through the transceiver 130 so as to manage the use of the electronic device. After the user having the sensing card 200 enters the target field, the management module 123 of the gateway 100 may receive the sensing card information of the sensing card 200 and generate the communication channel between the gateway 100 and the sensing card 200 based on the sensing card information. The management module 123 may determine that the holder of the sensing card 200 has the authority to operate the electronic device in response to the communication channel being generated. Accordingly, the management module 123 may activate the electronic device through the transceiver 130 for the holder of the sensing card 200 to use.

In one embodiment, the management module 123 may use the sensing card information to control the functions of the electronic device that the user may use. For example, if the electronic device has multiple functions, the management module 123 may activate specific functions in the electronic device according to the sensing card information of the sensing card 200 for the holder of the sensing card 200 to use.

In one embodiment, the management module 123 may obtain location information corresponding to the sensing card 200 through the communication channel between the gateway 100 and the sensing card 200. The management module 123 may activate the electronic device in response to the location information of the sensing card 200 matching a predicted location in the target field. For example, assuming that the predicted location in the target field is set to be around the electronic device, the management module 123 may activate the electronic device when the sensing card 200 moves to around the electronic device.

When there are multiple electronic devices in the target field, the gateway 100 may use different RF signals to manage the authority of using multiple electronic devices. Specifically, if the target field includes an electronic device A and an electronic device B, the communication module 122 of the gateway 100 may broadcast a RF signal A corresponding to the electronic device A and a RF signal B corresponding to electronic device B through the transceiver 130, where the RF signal A and the RF signal B may correspond to different communication protocols or frequency bands. If the sensing card 200 may receive the RF signal A and may generate the communication channel A between the gateway 100 and the sensing card 200 based on the RF signal A, it means that the holder of the sensing card 200 has the authority to use the electronic device A. The management module 123 of the gateway 100 may activate the electronic device A for the holder to use. On the other hand, if the sensing card 200 may receive the RF signal B and may generate the communication channel B between the gateway 100 and the sensing card 200 based on the RF signal B, it means that the holder of the sensing card 200 has the authority to use the electronic device B. The management module 123 of the gateway 100 may activate electronic device B for the holder to use. On the other hand, if the sensing card 200 cannot receive the RF signal B and cannot generate the communication channel B between the gateway 100 and the sensing card 200 according to the RF signal B, it means that the holder of the sensing card 200 does not have the authority to use the electronic device B. The management module 123 of the gateway 100 will not activate the electronic device B for the holder to use.

FIG. 4 shows a signal diagram for generating a communication channel between a gateway 100 and a sensing card 200 according to an embodiment of the disclosure. In step S401, the energy transmission module 121 of the gateway 100 may broadcast the first RF signal through the transceiver 130, and the communication module 122 may broadcast the second RF signal through the transceiver 130. In step S403, the energy harvesting module 221 of the sensing card 200 may receive the first RF signal through the transceiver 230, and switch the sensing card 200 from the disable mode to the enable mode according to the first RF signal. After the sensing card 200 switches to the enable mode, the communication module 222 of the sensing card 200 may receive the second RF signal through the transceiver 230. In step S405, the communication module 222 of the sensing card 200 may send the response signal corresponding to the second RF signal to the gateway 100 through the transceiver 230. The communication module 122 of the gateway 100 may receive the response signal through the transceiver 130. In step S407, the communication module 122 of the gateway 100 may generate the communication channel between the gateway 100 and the sensing card 200 according to the response signal.

FIG. 5 shows a flow chart of a log in method of a field according to an embodiment of the disclosure, where the log in method may be implemented by the log in system 10 shown in FIG. 1. In step S501, the gateway broadcasts the first RF signal and the second RF signal in the field. In step S503, the sensing card receives the first RF signal to switch from the disable mode to the enable mode; the sensing card receives the second RF signal, and generates the communication channel between the sensing card and the gateway in response to the second RF signal. In step S505, the gateway receives the sensing card information from the sensing card through the communication channel, and records the identification code corresponding to the sensing card to the log in list corresponding to the field according to the sensing card information.

In summary, the gateway of the disclosure can provide energy through RF signal for the sensing card to operate. The sensing card may be held by the user. The enabled sensing card can generate the communication channel with the gateway to complete the log in of a user. Users who log in to the field can use various electronic devices in the field according to their authorities. Also, the sensing cards may also be set in the object in the field. When the object is stolen and is taken away from the field, the gateway can send a warning message to remind the administrator that the object has been stolen.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A log in system of a field, the log in system comprising:
    a gateway, broadcasting a first RF signal and a second RF signal in the field; and
    a sensing card, receiving the first RF signal to switch from a disable mode to an enable mode, wherein the sensing card receives the second RF signal in the enable mode, and generates a communication channel between the sensing card and the gateway in response to the second RF signal, wherein
    the gateway receives sensing card information from the sensing card through the communication channel, and records an identification code corresponding to the sensing card to a log in list corresponding to the field according to the sensing card information, wherein
    the sensing card switches from the enable mode to the disable mode in response to not receiving the first RF signal and closes the communication channel, wherein
    the gateway removes the identification code from the log in list in response to the communication channel being closed.

2. The log in system as described in claim 1, wherein the first RF signal corresponds to a first frequency band, the second RF signal corresponds to a second frequency band, and the first frequency band is different from the second frequency band, wherein the first RF signal corresponds to a RF energy harvesting technology, and the second RF signal corresponds to a Bluetooth communication protocol.

3. The log in system as described in claim 1, wherein the first RF signal corresponds to a first frequency band, the communication channel corresponds to a second frequency band, and the first frequency band is different from the second frequency band, wherein the first RF signal corresponds to a RF energy harvesting technology, and the communication channel corresponds to a Bluetooth communication protocol.

4. The log in system as described in claim 1, wherein the gateway sends a warning message in response to the identification code being removed from the log in list.

5. The log in system as described in claim 1, wherein the gateway pre-stores a white list, and sends a warning message in response to the identification code not matching the white list.

6. The log in system as described in claim 1, wherein the gateway is communicatively connected to an external electronic device in the field, and activates the external electronic device according to the sensing card information in response to the communication channel being generated.

7. The log in system as described in claim 6, wherein the gateway obtains location information of the sensing card from the communication channel, and activates the external electronic device in response to the location information matching a predetermined location.

8. The log in system as described in claim 6, wherein
    the gateway is communicatively connected to a second external electronic device in the field and broadcasts a third RF signal, wherein
    the sensing card receives the third RF signal in the enable mode, and generates a second communication channel between the sensing card and the gateway in response to the third RF signal, wherein
    the gateway activates the second external electronic device according to the sensing card information in response to the second communication channel being generated.

9. The log in system as described in claim 8, wherein the second RF signal corresponds to a second frequency band, and the third RF signal corresponds to a third frequency band, wherein the second frequency band is different from the third frequency band.

10. A log in method of a field, the long in method comprising:
    a gateway broadcasting a first RF signal and a second RF signal in the field;
    a sensing card receiving the first RF signal and switching from a disable mode to an enable mode; the sensing card receiving the second RF signal in the enable mode, and generating a communication channel between the sensing card and the gateway in response to the second RF signal;
    the gateway receiving the sensing card information from the sensing card through the communication channel, and recording an identification code corresponding to the sensing card to a log in list corresponding to the field according to the sensing card information;
    the sensing card switching from the enable mode to the disable mode in response to not receiving the first RF signal, and closing the communication channel; and
    the gateway removing the identification code from the log in list in response to the communication channel being closed.

11. The log in method as described in claim 10, wherein the first RF signal corresponds to a first frequency band, the second RF signal corresponds to a second frequency band, and the first frequency band is different from the second frequency band, wherein the first RF signal corresponds to a RF energy harvesting technology, and the second RF signal corresponds to the a Bluetooth communication protocol.

12. The log in method as described in claim 10, wherein the first RF signal corresponds to a first frequency band, the communication channel corresponds to a second frequency band, and the first frequency band is different from the second frequency band, wherein the first RF signal corresponds to a RF energy harvesting technology, and the communication channel corresponds to a Bluetooth communication protocol.

13. The log in method as described in claim 10, further comprising:
    the gateway sending a warning message in response to the identification code being removed from the log in list.

14. The log in method as described in claim 10, further comprising:
the gateway pre-storing a white list and sending a warning message in response to the identification code not matching the white list.

15. The log in method as described in claim 10, further comprising:
the gateway being communicatively connected to an external electronic device in the field, and activating the external electronic device according to the sensing card information in response to the communication channel being generated.

16. The log in method as described in claim 15, wherein activating the external electronic device in response to the communication channel comprises:
the gateway obtaining location information of the sensing card from the communication channel, and activating the external electronic device in response to the location information matching a predetermined location.

17. The log in method as described in claim 15, further comprising:
the gateway being communicatively connected to a second external electronic device in the field and broadcasting a third RF signal;
the sensing card receiving the third RF signal in the enable mode and generating a second communication channel between the sensing card and the gateway in response to the third RF signal; and
the gateway activating the second external electronic device according to the sensing card information in response to the second communication channel being generated.

18. The log in method as described in claim 17, wherein the second RF signal corresponds to a second frequency band, and the third RF signal corresponds to a third frequency band, wherein the second frequency band is different from the third frequency band.

* * * * *